United States Patent [19]

Roberts et al.

[11] Patent Number: 4,729,034

[45] Date of Patent: Mar. 1, 1988

[54] METHOD AND APPARATUS FOR SELECTION OF A CODING REFERENCE LINE FOR TWO-DIMENSIONAL CODING OF IMAGE DATA REPRESENTING SCREENED IMAGES

[75] Inventors: Lawrence G. Roberts, Woodside; Alex E. Henderson, El Granada, both of Calif.

[73] Assignee: Netexpress Systems, Inc., San Mateo, Calif.

[21] Appl. No.: 749,606

[22] Filed: Jun. 27, 1985

[51] Int. Cl.[4] .................... H04N 1/419; H04N 1/413; H04N 7/12
[52] U.S. Cl. .................................. 358/261; 358/133; 358/135; 358/260
[58] Field of Search ................ 358/260, 135, 261, 133

[56] References Cited

U.S. PATENT DOCUMENTS

| | | | |
|---|---|---|---|
| 4,144,547 | 3/1979 | Stoffel | 358/260 |
| 4,215,375 | 7/1980 | Usubuchi et al. | 358/261 |
| 4,425,582 | 1/1984 | Kadakia et al. | 358/260 |
| 4,511,213 | 4/1985 | Yamazaki et al. | 358/260 |
| 4,559,563 | 12/1985 | Joiner, Jr. | 358/260 |
| 4,571,634 | 2/1986 | Caneschi et al. | 358/260 |
| 4,631,521 | 12/1986 | El-Sherbini | 358/260 |
| 4,633,325 | 12/1986 | Usubuchi | 358/260 |
| 4,667,251 | 5/1987 | Hasegawa | 358/261 |

FOREIGN PATENT DOCUMENTS

| | | | |
|---|---|---|---|
| 57-190461 | 11/1982 | Japan | 358/261 |
| 59-2485 | 1/1984 | Japan | 358/260 |

OTHER PUBLICATIONS

"Standardization of Group 3 Facsimile Apparatus for Document Transmission", *CCITT Recommendation* T.4, Geneva, 1980, pp. 222-234.
Usubuchi, Touro et al., "Adaptive Predictive Coding for Newspaper Facsimile", *Proceedings of the IEEE*, vol. 68, No. 7, Jul. 1980, pp. 807-813.
Johnsen, O., "A New Code for Transmission of Ordered Dithered Pictures", *The Bell System Technical Journal*, vol. 60, No. 3, Mar. 1981, pp. 379-389.
Johnsen, O., et al., "An Extension of the CCITT Facsimile Codes for Dithered Pictures", *The Bell System Technical Journal*, vol. 60, No. 3, Mar. 1981, pp. 391-404.
Liao, Henry H., "Adaptive Predictor for Haltone or Line Graphics", *Xerox Disclosure Journal*, vol. 6, No. 5, Sep./Oct. 1981, pp. 281-282.

Primary Examiner—James J. Groody
Assistant Examiner—Randall S. Svihla
Attorney, Agent, or Firm—Townsend & Townsend

[57] ABSTRACT

A method and apparatus for selecting a reference scan line for two-dimensional image coding preferably compatible with known facsimile transmission equipment are disclosed. Selection of a reference scan line in accordance with the method and apparatus of the invention allows data compression for facsimile transmission so that the cost for use of the communication link is reduced. More than one previous scan line is considered as a candidate reference scan line. A reference scan line is selected from among a plurality of previous scan lines, for example, the immediately preceding ten scan lines. The preselected or adaptively selected scan line among the multiple prior scan lines, more particularly, the previous scan line which is most similar to the current scan line to be coded, is selected as the reference scan line. The reference scan line is then fed with the current scan line to be coded to a two-dimensional data compression coding process so as to yield optimum data compression. This reduces the amount of image data transmitted and lowers the cost of operation of the facsimile transmission apparatus. The method and apparatus are particularly effective for compressing image data representing screened pictorial images.

16 Claims, 7 Drawing Figures

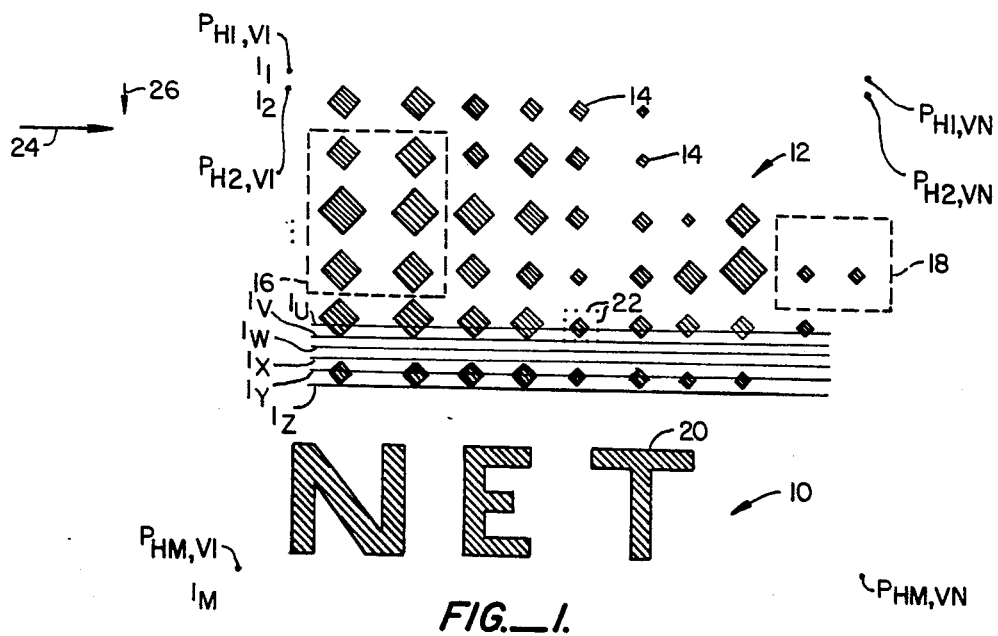
FIG._1.
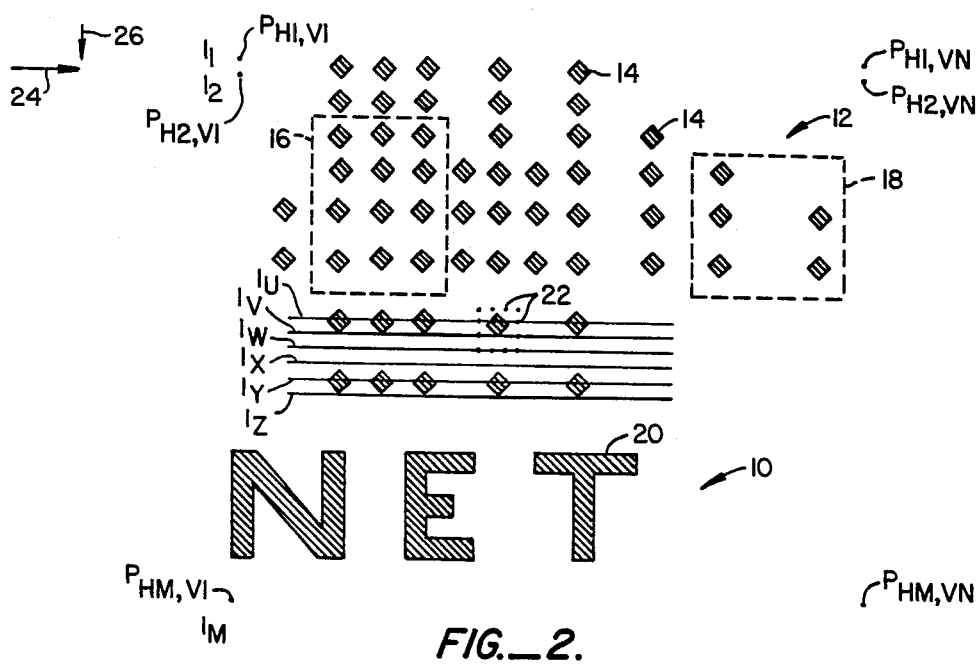
FIG._2.

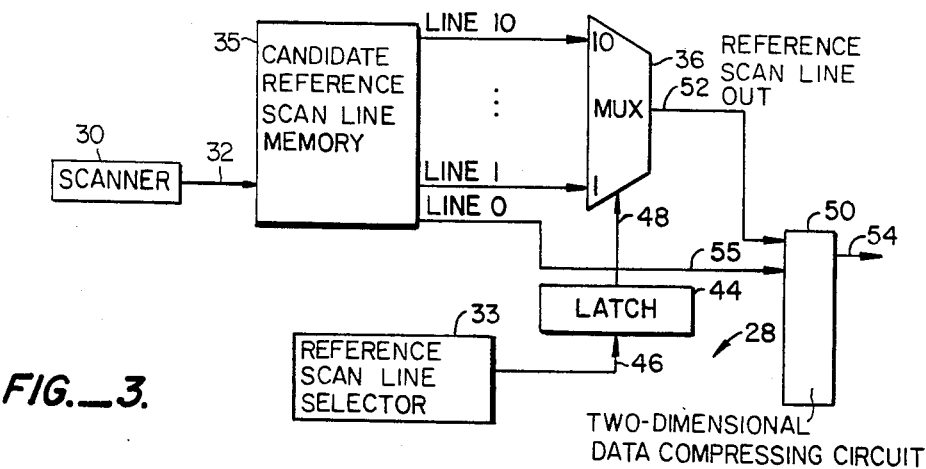
FIG._3.
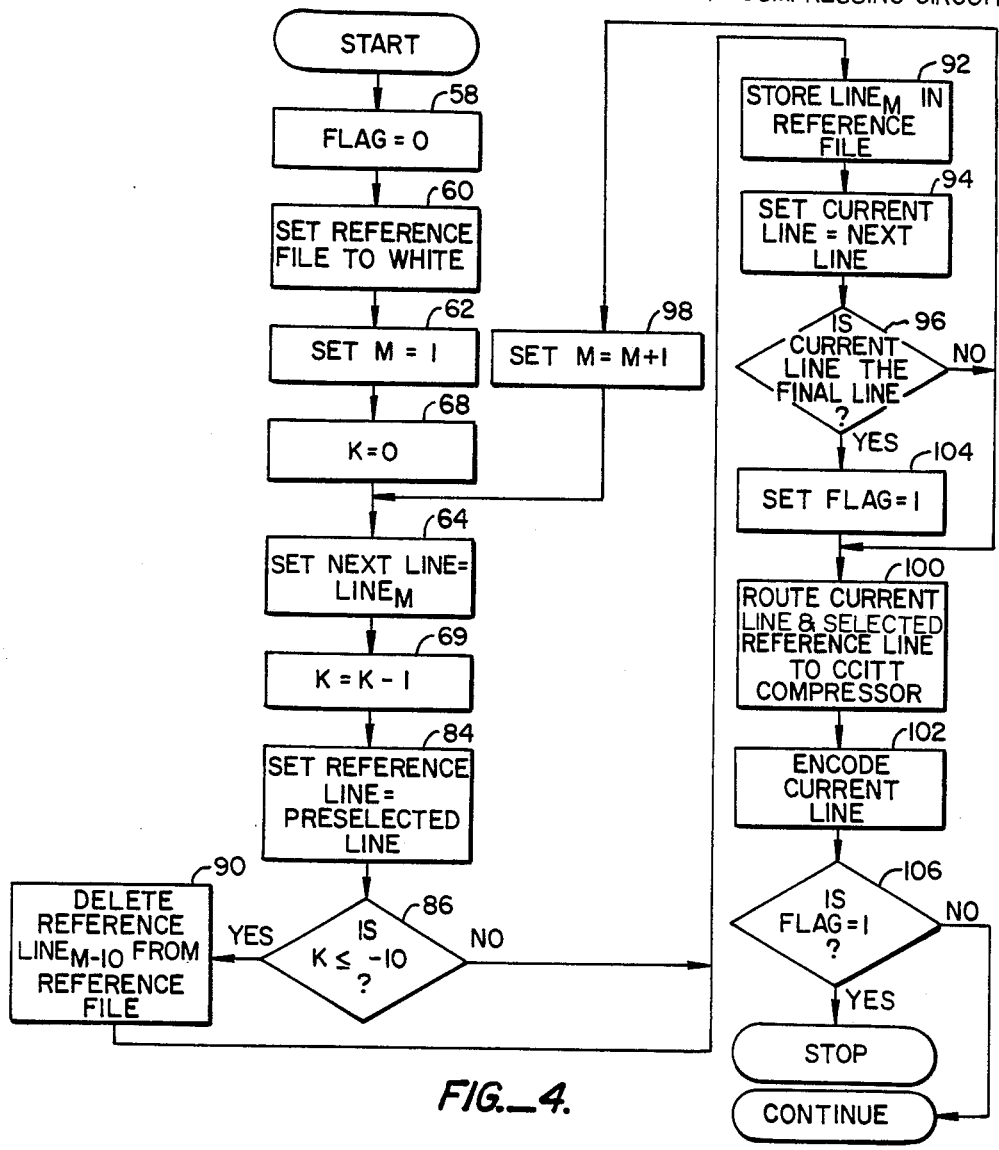
FIG._4.

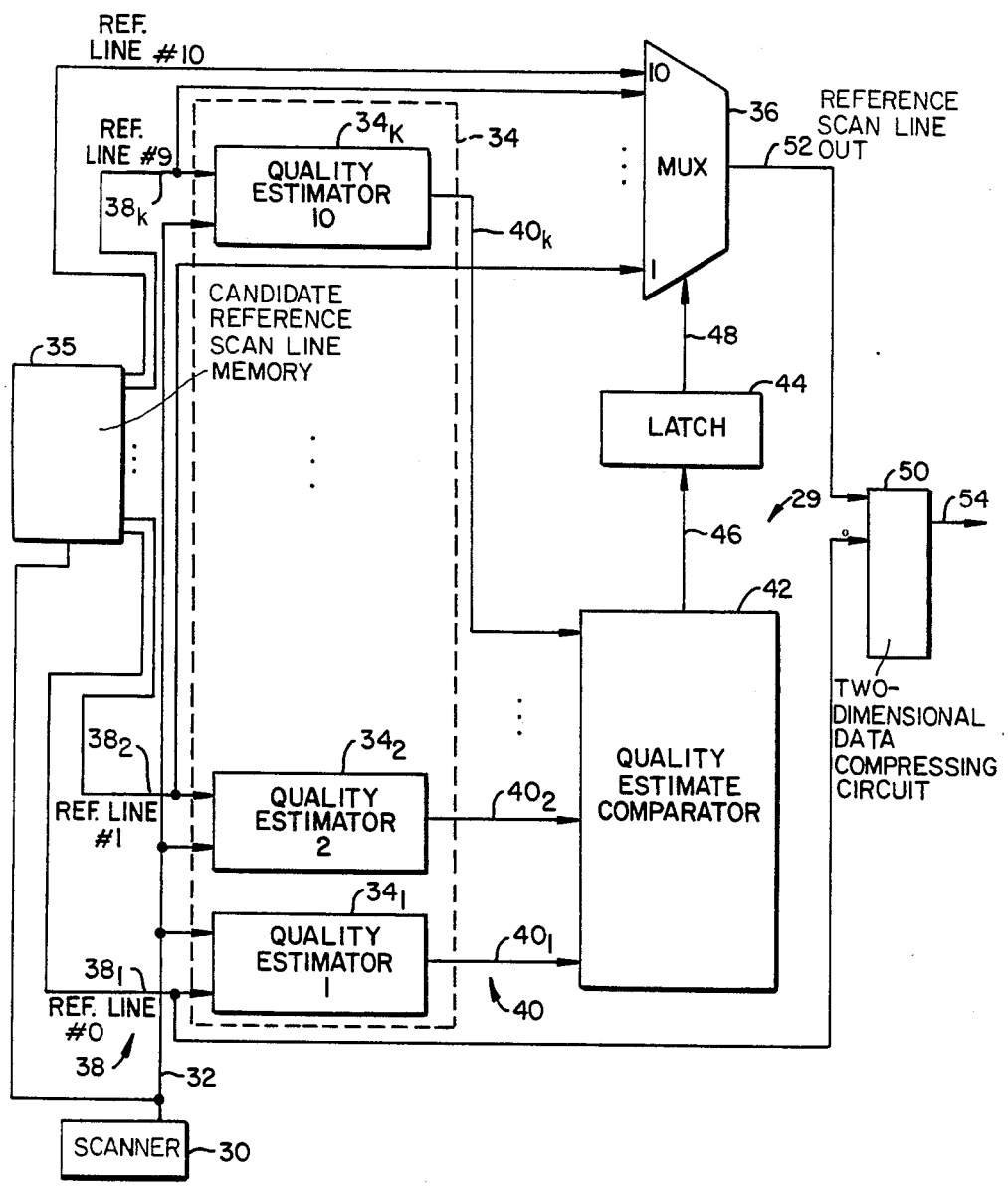
FIG._5.

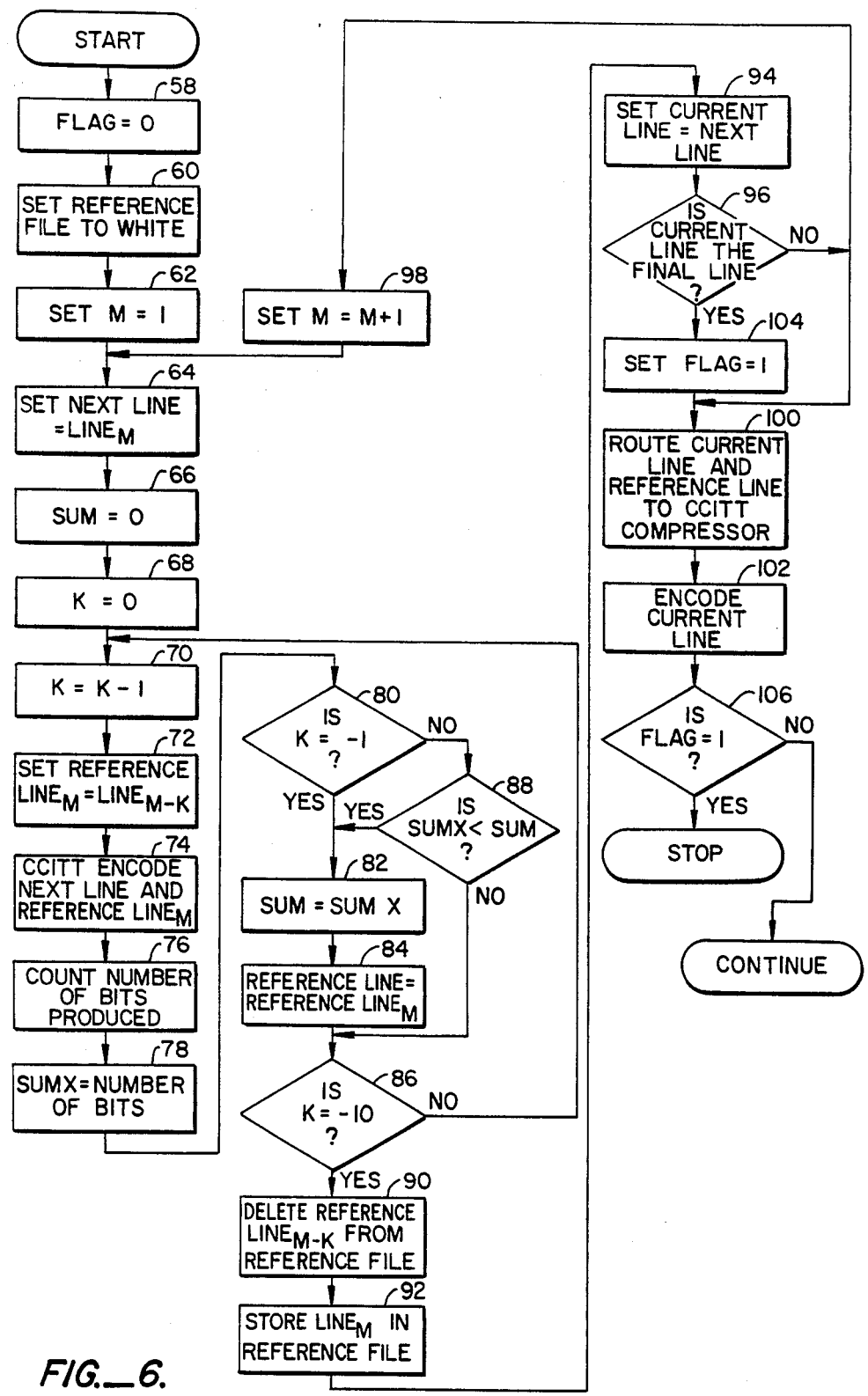
FIG._6.

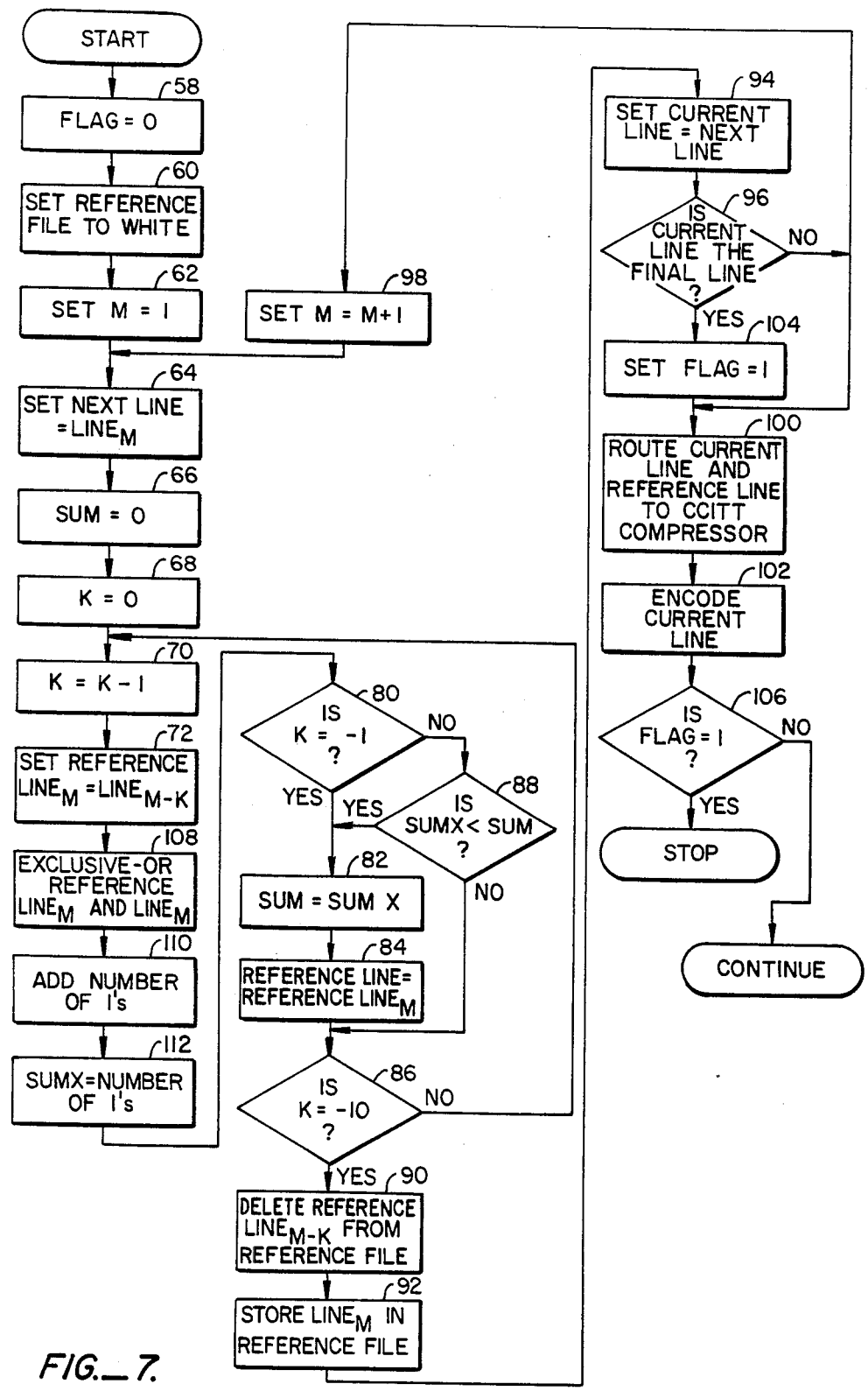
FIG._7.

000
METHOD AND APPARATUS FOR SELECTION OF A CODING REFERENCE LINE FOR TWO-DIMENSIONAL CODING OF IMAGE DATA REPRESENTING SCREENED IMAGES

BACKGROUND OF THE INVENTION

This invention relates to two-dimensional image coding and, more particularly, to data compression in connection with vertical mode type image coding of image data representing screened images. Specifically, the invention is directed to a method and apparatus for scan line reference selection relative to coding images to enable increased data compression, for example, in connection with facsimile transmission.

Equipment for telecommunication of images is known. The images can comprise text, as well as pictorial information, such as illustrations, photographs, and graphic information. Known telecommunication equipment comprises a system whereby a transmitter at one location encodes an image, the encoded image is communicated over a communication link, such as a telephone line, to a receiver at another location, and the receiver decodes the image. The image decoded by the receiver corresponds to the image encoded by the transmitter. Consequently, a facsimile of the original image is communicated over a distance from the transmitter to the receiver. Hence, the telecommunication equipment has become known as facsimile transmission equipment.

Facsimile transmission equipment is commercially available from various manufacturers. In order to provide compatibility among the known facsimile transmission equipment produced by different manufacturers, various standards have been adopted. Typically, known facsimile transmission equipment utilizes a raster scan of an image to be coded. Known facsimile transmission equipment is also typically standardized for providing Modified Modified Read (MMR) coding, as described in *"STANDARDIZATION OF GROUP 3 FACSIMILE APPARATUS FOR DOCUMENT TRANSMISSION,"* CCITT Recommendation T.4 (Geneva, 1980). Modified Modified Read coding includes horizontal mode coding, and the "Read" portion of "Modified Modified Read" represents relative address coding (RAC) also known as vertical mode coding.

On the one hand, the horizontal mode coding technique does not require a reference scan line in connection with coding each scanned line of the image. On the other hand, the vertical mode coding technique requires a reference scan line for each scanned line of the image as the image data is encoded for transmission at the transmitter. The reference scan line is also required by the vertical mode coding technique when the transmitted image data is decoded at the receiver.

Whether or not the horizontal or vertical mode coding technique is utilized is defined by the known CCITT facsimile coding algorithms described in the aforementioned CCITT Recommendation T.4 entitled *"STANDARDIZATION OF GROUP 3 FACSIMILE APPARATUS FOR DOCUMENT TRANSMISSION"* (Geneva, 1980). These standards specify conditions under which the vertical mode coding technique may be utilized. If both the reference scan line and the current scan line are used for coding, the process is referred to as vertical mode coding. If the current scan line alone is used for coding, the process is referred to as horizontal mode coding.

Typically, the major cost for operation of known facsimile transmission equipment is the cost of the communication link, such as a telephone line. Preferably, the image data is compressed by means of the known CCITT facsimile data compression coding algorithms utilizing the vertical mode coding technique prior to facsimile transmission. The purpose of the data compression is to reduce the amount, more particularly, the number of bits, of image data to be transmitted, thereby reducing the operating cost. Presently, the amount of image data to be transmitted is of particular concern in the case of pictorial information.

Known facsimile transmission equipment generally requires that a pictorial image be screened prior to coding and transmitting the image. Screening a pictorial image can be performed in several ways.

Screened pictorial images under a magnifying glass generally comprise either circular or diamond-shaped dots aligned in vertical columns. The size of each circle or diamond, or the density of circles or diamonds, in a given area of the pictorial image varies as a function of the gray scale for the given area.

Unfortunately, if a screened pictorial image is to be transmitted, the CCITT facsimile data compression coding algorithms do not operate well, because these algorithms cannot optimally utilize the typical Delta Modulation scheme which is employed whereby the current scan line to be coded is represented by coding only the changes or differences between the current scan line and the reference scan line and the result or difference data comprises the image data which is communicated. Invariably, the CCITT facsimile data compression coding algorithms utilize the Delta Modulation scheme for compressing the current scan line to be coded based on the immediately preceding scan line. The immediately preceding scan line is used as a reference scan line so that the current scan line to be coded can be represented by coding only the changes or differences between the current scan line to be coded and the immediately preceding scan line. However, the differences between the current scan line to be coded and the immediately preceding scan line can be great. Consequently, the amount of image data transmitted over the communication link can be substantial. This translates to a high cost for operation of the facsimile transmission equipment, since the cost for the use of the communication link is based on the amount of image data which is communicated.

SUMMARY OF THE INVENTION

This invention provides a method and apparatus for selecting a reference scan line for two-dimensional coding, such as vertical mode coding. The reference selection method and apparatus in accordance with the invention provide improved data compression of image data for storage or transmission of the image data, for example, in connection with facsimile transmission utilizing the CCITT facsimile data compression coding algorithms in accordance with the specifications described in *"STANDARDIZATION OF GROUP 3 FACSIMILE APPARATUS FOR DOCUMENT TRANSMISSION,"* CCITT Recommendation T.4 (Geneva, 1980). In the exemplary case of facsimile transmission, selection of a reference scan line in accordance with the method and apparatus of the invention allows improved data compression of image data for facsimile transmission so that the cost for use of the communication link is reduced.

Generally, the invention expands the present binary decision of no reference scan line for horizontal mode coding versus an immediately preceding scan line as reference scan line for vertical mode coding into a determination of no reference scan line for horizontal mode coding versus a reference one scan line back, two scan lines back, or K scan lines back for vertical mode coding. The invention relates to a determination of which of a plurality of preceding scan lines is used as a reference scan line for vertical mode coding. The horizontal mode coding, on the other hand, is unaffected.

In accordance with one embodiment of the invention, reference scan line selection is provided based on a recurring pattern which can appear in the image represented by the image data to be coded. A reference scan line is preselected based on the recurring pattern present in the image and reflected in the image data to be coded. The preselected reference scan line can be other than the scan line immediately preceding the current scan line to be coded.

In accordance with another embodiment of the invention, adaptive reference scan line selection is provided. Adaptive reference scan line selection for K sets of candidate reference scan line image data can be divided into (K+1) steps. These comprise K steps that produce an estimate of the data compression which results from the use of each candidate reference scan line or of the quality of each candidate reference scan line. One embodiment of the estimation process, for example, is the two-dimensional data compression coding process, such as the CCITT facsimile data compression coding process. The estimate is the number of output bits produced by the data compression process. A quality comparison process compares the estimates and passes the best reference scan line and the current scan line to be coded to the two-dimensional data compression coding process. Another embodiment of the estimation process is to count the number of bits in the image data for each candidate reference scan line that do not match the image data for the current scan line to be coded. This is preferably performed by an exclusive-OR combination of the image data for each candidate reference scan line with image data for the current scan line to be coded followed by a count of the number of bits having a predetermined logic state. The candidate reference scan line that produces the lowest number of bits that do not match is selected as the reference scan line.

In contrast to known facsimile transmission equipment which uses the immediately preceding scan line as a reference scan line for vertical mode coding, the method and apparatus in accordance with the invention can employ other than the immediately preceding scan line as the reference scan line. The key feature of the invention resides in the reference scan line selection for the current scan line to be coded. The invention lies in the choice of the reference scan line and how the reference scan line is chosen. Specifically, unlike the known vertical mode coding technique which uses the immediately preceding scan line as the reference scan line, the method and apparatus in accordance with the invention provide selection of a reference scan line from among a plurality of preceding scan lines, for example, the immediately preceding ten scan lines. The scan line among the multiple prior scan lines which yields optimum Delta Modulation is selected as the reference scan line. The image data for the reference scan line is then fed with the image data for the current scan line to be coded to the two-dimensional data compression coding algorithms, such as the known CCITT facsimile data compression coding algorithms, so as to yield optimum data compression. This reduces the amount of image data transmitted and lowers the cost of operation of the facsimile transmission apparatus.

BRIEF DESCRIPTION OF THE DRAWINGS

The above and other features of the invention and the concomitant advantages will be better understood and appreciated by those skilled in the art in view of the description of the preferred embodiments given below in conjunction with the accompanying drawings. In the drawings:

FIG. 1 is a schematic representation of an image comprised of textual and pictorial information, the pictorial information being represented by pixels of various sizes, the pixels being shown on an enlarged scale;

FIG. 2 is a schematic representation of an image comprised of textual and pictorial information, the pictorial information being represented by pixels arranged in various densities, the pixels being shown on an enlarged scale;

FIG. 3 is a block diagram of one embodiment of image coding apparatus in accordance with the invention;

FIG. 4 is a flow chart of an embodiment of reference scan line selection method performed by the image coding apparatus shown in FIG. 3;

FIG. 5 is a block diagram of another embodiment of image coding apparatus in accordance with the invention;

FIG. 6 is a flow chart of one embodiment of adaptive reference scan line selection method performed by the image coding apparatus shown in FIG. 5; and FIG. 7 is a flow chart of another embodiment of adaptive reference scan line selection method performed by the image coding apparatus shown in FIG. 5.

DESCRIPTION OF THE PREFERRED EMBODIMENTS

In accordance with the invention, a plurality of previously scanned lines, any one of which can prospectively be used as a reference scan line, is checked before the current scan line is coded by means of a two-dimensional image coding technique, such as the known CCITT facsimile data compression coding algorithms with the vertical mode coding technique. A reference scan line can be preselected based on the presence of a recurring pattern which can appear in the image represented by the image data to be coded. The recurring pattern establishes a pattern relationship between the reference scan line and the current scan line to be coded. In this case, the reference scan line is a predetermined number of scan lines earlier than the current scan line to be coded and, further, can be other than the scan line immediately preceding the current scan line to be coded. Alternatively, the reference scan line can be adaptively selected based on a check of a predetermined number of previous scan lines. Preferably, the ten immediately preceding scan lines are checked. The previous scan line which most closely matches the current scan line to be coded and therefore establishes the nearest pattern relationship is used as the reference scan line for coding the current scan line.

The preselected reference scan line or the most closely matched previous scan line together with the current scan line to be coded are then processed in accordance with a two-dimensional image coding technique, such as the CCITT facsimile data compression coding algorithms with the vertical mode coding technique.

The resulting differences between the current scan line to be coded and the previous scan line used as the reference scan line are minimal. Consequently, when the current scan line to be coded is represented by coding only the changes or differences between the current scan line and the reference scan line by means of Delta Modulation, the difference data is minimal. As a result, the two-dimensional data compression coding algorithms, such as the known CCITT facsimile data compression coding algorithms, produce substantially greater compression of the image data when the reference selection method and apparatus in accordance with the invention are used. Therefore, the amount of image data transmitted is reduced so that the cost of operation of the facsimile transmission apparatus is lowered.

By way of background, an image can generally include two basic categories of information, namely, textual information and/or pictorial information. The case in which both textual information and pictorial information appear on a page of a document is represented in FIGS. 1 and 2.

As shown in FIG. 1, textual information is generally indicated by the numeral 10. Pictorial information is generally indicated by the numeral 12. For the purposes of description, the pictorial information 12 is shown greatly magnified relative to the textual information 10. This magnification shows that the pictorial information 12 is represented in a screened form such that the pictorial information comprises an array of diamond-shaped picture elements or pixels 14. The pictorial information 12 is screened or formatted so that variation of the size of the pixels 14 determines the shade of the various portions of the pictorial information. The shade of the portion of the pictorial information 12 contained within the dotted lines 16, for example, appears darker than the portion of the pictorial information contained within the dotted lines 18, for example. The pixels 14 can be monochrome as shown in FIG. 1, as well as multi-color in the case of polychrome pictorial information 12.

As shown in FIG. 2, the pictorial information 12 is again shown greatly magnified relative to the textual information 10. This magnification shows that the pictorial information 12 is represented in a screened form such that the pictorial information again comprises an array of diamond-shaped picture elements or pixels 14. However, the pictorial information 12 is screened or formatted so that variation of the density of the pixels 14 determines the shade of the various portions of the pictorial information. The shade of the portion of the pictorial information 12 contained within the dotted lines 16, for example, appears darker than the portion of the pictorial information contained within the dotted lines 18, for example. The pixels 14 can be monochrome as shown in FIG. 2, as well as multi-color in the case of polychrome pictorial information 12.

While the variation in size or density of the pixels 14 corresponds to variation in the shade of the pictorial information 12, by way of comparison, the textual information 10 is typically defined fully without the need for variation of shade. Consequently, the textual information 10 is not typically screened as is the pictorial information 12. The textual information 10 can be characterized as characters 20, as compared to pixels 14 in the case of the pictorial information 12.

In order for an image such as the textual information 10 and the pictorial information 12 shown in FIGS. 1 and 2 to be coded for storage and/or facsimile transmission, the image is initially scanned. The number of scan positions or points 22 of the image to be coded can vary. Generally, however, the size of the pixels 14 exceeds the size of the scan points 22 or the frequency of the scan points exceeds the number of pixels by at least a ratio of eight to one in order that the pictorial information 12 can be faithfully reproduced. For example, the frequency of scan points 22 in a first direction 24, such as the horizontal direction, as well as a second direction 26, such as the vertical direction, can be 400 per inch, more particularly, 400 scan points per inch across the page of the document in the horizontal direction by 400 scan points per inch in the vertical direction.

Typically, the textual information 10 and the pictorial information 12 can be scanned by a raster scan which begins at a scan point 22 located at a position $P_{H1,V1}$ and scans in the horizontal direction 24 across the image to be coded to and including a scan point located at a position $P_{H1,VN}$, as shown in FIGS. 1 and 2. In the case of an international size document on size A4 paper, for example, there can be 4,768 scan points 22 across the page of the document. Thereafter, the scan continues with a scan point 22 located at a positio $P_{H2,V1}$ across to and including a scan point located at a position $P_{H2,VN}$, and so on, until the entire page of the document is scanned including the scan point located at the position $P_{HM,VN}$. For the purpose of explanation, the arrays of scan points 22 located at position $P_{H1,V1}$, $P_{H1,V2}$, ... $P_{H1,VN}$, etc., in the horizontal direction 24 are referred to as scan lines, and the arrays of scan points located at positions $P_{H1,V1}$, $P_{H2,V1}$, ... $P_{HM,V1}$, etc., in the vertical direction 26 are referred to as columns. By way of shorthand notation, the line of scan points 22 located at positions $P_{H1,V1}$, $P_{H1,V2}$, ... $P_{H1,VN}$ is designated scan line $l_1$; the line of scan points located at positions $P_{H2,V1}$, $P_{H2,V2}$, ... $P_{H2,VN}$ is designated scan line $l_2$; and so on, with the last line of scan points located at positions $P_{HM,V1}$, $P_{HM,V2}$, ... $P_{HM,VN}$ being designated as scan line $l_M$.

When the image is scanned, the textual information 10 and the pictorial information 12 are preferably represented in a binary format such that a first logic state, for example, a low logic state or logic zero state, indicates that the particular scan point 22 does not coincide with any portion of a pixel 14 or a character 20. Conversely, a second logic state, for example, a high logic state or logic one state, indicates that the scan point 22 coincides with a portion of a pixel 14 or a portion of a character 20. Consequently, the image data appears as an array of first and second logic states which constitute the image data for the lines $l_1, l_2, \ldots l_M$.

In accordance with the known vertical mode coding technique, the immediately preceding scan line is used as a reference scan line for the current scan line to be coded. For example, the scan line $l_1$ is used as the reference scan line when the scan line $l_2$ is coded, the reference scan line $l_2$ is used as the reference scan line when the scan line $l_3$ is coded, and so on. The difference between the two adjacent scan lines used for vertical mode coding, however, can be great. For example, the difference between the image data for the scan line $l_U$ and the image data for the scan line $l_V$ is significant, as is the difference between the image data for the scan line $1_V$ and the image data for the scan line $1_W$, as is the difference between the image data for the scan line $1_X$ and the image data for the scan line $1_Y$, as is the difference between the image data for the scan line $1_Y$ and the image data for the scan line $1_Z$, for example.

In accordance with the reference selection method and apparatus of the invention, however, the reference scan line for the current scan line to be coded can be other than the immediately preceding scan line. Therefore, while the difference between the image data for the scan line $1_Z$ and the image data for the scan line $1_Y$ is significant, the image data for the scan line $1_Z$ does not differ significantly from the image data for the scan line $1_V$. Consequently, in accordance with the reference selection method and apparatus of the invention, the scan line $1_V$ can be used as the reference scan line for the scan line $1_Z$ to be coded with the result that there is a substantial reduction of the image data to be transmitted in contrast to the known vertical mode coding technique where the scan line $1_Y$ is used as the reference scan line for the scan line $1_Z$ to be coded. The reference scan line selection method and apparatus in accordance with the invention respond to the binary coded image data for optimally coding the image data when the two-dimensional coding technique, such as the vertical mode coding technique, is utilized for data compression, thereby optimizing the coding metrics.

FIG. 3 is a block diagram of one embodiment of apparatus for selecting a reference scan line in accordance with the invention, the apparatus being generally indicated by the numeral 28. In the embodiment of the reference scan line selection apparatus 28 shown in FIG. 3, a scanner 30 is utilized for scanning the image to be coded. The scanner 30 is preferably a charge coupled device (CCD). Preferably, the scanner 30 is a component of the Canon Laser Copier System (Part No. SSF-J7605) manufactured by Canon, Inc., of Japan. The scanner 30 preferably scans 400 scan points per inch in the horizontal direction 24 across the image by 400 lines per inch in the vertical direction 26.

In the case that the image is pictorial information, such as an illustration or photograph, the image to be coded is either already screened, or the scanner 30 includes a feature which performs the screening process. The Canon scanner can digitally screen a pictorial image. The image to be coded, however, does not need to be completely screened, for example, the textual information 10 need not be screened.

The image data scanned by the scanner 30 appears on a bus 32. The bus 32 connects the scanner 30 to a memory 35 and a multiplexer circuit 36. The image data for a plurality of candidate reference scan lines is stored in the memory 35.

The reference scan line selection apparatus 28 shown in FIG. 3 also includes a reference scan line selector circuit 33. The reference one of scan line selector circuit 33 is preset for selecting the candidate reference scan line stored in the memory 35 for use as the reference scan line for the current scan line to be coded.

The reference scan line selector circuit 33 is preset based on the determination of the presence of a recurring pattern which can appear in the image represented by the image data to be coded. The appearance of recurring patterns in the image data to be coded originates from the format for the characters 20 in the case of the textual information 10 and the size and shape of the pixels 14 in the case of the pictorial information 12 which has been screened.

Referring again briefly to FIGS. 1 and 2, the similarity between the scan line $1_V$ and the scan line $1_Z$ can be seen to be due in part to the symmetrical configuration of the diamond-shaped pixels 14 which comprise the screened pictorial information 12. Interestingly, the configuration of the pixels 14 which comprise the pictorial information 12 that has been screened contributes to the difference between the more proximal scan lines $1_W$, $1_X$, and $1_Y$. Recognition of the recurrence of a pattern present in the resultant image data produced in connection with the scan line $1_V$ and the scan line $1_Z$ is one significant factor in the determination of how the reference scan line selector circuit 33 is preset.

Another important factor in how the reference scan line selector circuit 33 is preset results from the particular size or frequency of the pixels 14 which comprise the screened pictorial information 12. As described above, the scanner 30 is selectively operated for screening an image to be coded. However, the image can be pre-screened. The reference scan line selector circuit 33 is preset based on analysis of the pictorial information 12 screened by the scanner 30 in the case where the scanner screens the pictorial information and, alternatively, based on analysis of the screening size of pre-screened pictorial information which appears in the image to be coded.

In summary, a determination is made that there is a recurring pattern present in the image represented by the image data to be coded based on the symmetry of the pixels 14 which comprise the screened pictorial information 12 and the size or frequency of the pixels in light of the particular process utilized for screening the pictorial information. This recurring pattern is clearly indicated in FIGS. 1 and 2 by comparison of the scan line $1_V$ with the scan line $1_Z$. As a result, the reference scan line selector circuit 33 can be preset for selecting the candidate reference scan line stored in the memory 35 which is most similar to the current scan line to be coded in view of the recurring pattern. Therefore, if the scan line $1_Z$ is the current scan line to be coded, the candidate reference scan line four lines back, more particularly, the scan line $1_V$, is preset as the reference scan line to be selected.

For example, analysis has been made of the screening size of pre-screened pictorial information which appears in commercially available publications, such as magazines and newspapers. The size ranges from two and one-half scan points 22 per pixel 14 to ten scan points per pixel. In the case where the size is two and one-half scan points 22 per pixel 14, the reference scan line selector circuit 33 is preset to select the candidate reference scan line which is two scan lines preceding the current scan line to be coded. In the case where the size is ten scan points 22 per pixel 14, the candidate reference scan line selected is the scan line preceding the current scan line to be coded by nine scan lines.

As shown in FIG. 3, the reference scan line selector circuit 33 is connected to a latch circuit 44 via a bus 46. The latch circuit 44 is connected to the multiplexer circuit 36 via a bus 48. The reference scan line selector circuit 33 enables a given latch included in the latch circuit 44, which corresponds to the latch that controls gating of the image data for the preselected candidate reference scan line from the memory 35 via the multiplexer circuit 36 to a two-dimensional data compression circuit 50 via a bus 52.

The current scan line to be coded is fed to the two-dimensional data compression circuit 50 via a bus 55 for coding while the preselected candidate reference scan line for the next scan line to be coded is being selected. The coded current scan line, based on two-dimensional coding with the preselected candidate reference scan line, appears on a bus 54.

Considered in more detail, one embodiment of reference scan line selection method in accordance with the invention is shown in FIG. 4. As shown in FIG. 4, a flag is initially cleared, as indicated by the numeral 58. Also, the memory 35 is cleared so that the storage locations included in the memory for the candidate reference scan lines contain the logic zero state (i.e., the lines are preferably set as white scan lines), as indicated by the numeral 60.

Next, an iterative procedure for the determination of the reference scan line for each of the scan lines of the image, such as the scan lines $l_1, l_2, \ldots l_M$ shown in FIGS. 1 and 2, is undertaken. Initially, an index, denoted M to correspond to the lines of the image to be coded, is set equal to one, as indicated by the numeral 62. Initially, another index, denoted K to correspond to the number of preceding lines which can be used as candidate reference scan lines, is set equal to zero, as indicated by the numeral 68.

Thereafter, the image data for the next scan line to be coded, which is initially the scan line $l_1$, is output from the scanner 30, as indicated by the numeral 64. The index K is set equal to (K−1) to indicate that the initial scan line of the image is being coded, as indicated by the numeral 69.

Then, the preselected candidate reference scan line is selected as the reference scan line for the next scan line to be coded. The determination of the reference scan line for the next scan line to be coded is based on the presetting of the reference scan line selector circuit 33.

Since the memory 35 is initially cleared, as indicated by the numeral 60, there are not ten actual candidate reference scan lines until the eleventh line of the image is scanned. Nevertheless, the reference scan line selection method in accordance with the invention utilizes the information in the memory 35 as though actual candidate reference scan lines were currently stored in the memory.

The reference scan line is set to the preselected reference scan line, as indicated by the numeral 84. The index K is then checked to determine whether or not the memory 35 stores ten actual candidate reference scan lines, as indicated by the numeral 86. If the memory 35 contains ten actual candidate reference scan lines, the tenth scan line back stored in the memory is deleted, as indicated by the numeral 90, and the next scan line to be coded is stored in the memory, as indicated by the numeral 92, whereas if ten actual candidate reference scan lines are not contained in the memory, the next scan line to be coded is simply stored in the memory, as indicated by the numeral 92.

Next, the next scan line to be coded, for which the preselected candidate reference scan line has just been determined, becomes the current scan line to be coded, as indicated by the numeral 94. The current scan line to be coded is then checked to determine whether or not the current scan line is the final scan line of the image to be coded, as indicated by the numeral 96.

If on the one hand the current scan line to be coded is not the final scan line of the image to be coded, the index M is set equal to (M+1), as indicated by the numeral 98, and the reference scan line for the next scan line to be coded is determined analogously to the determination as described above, while the current scan line to be coded and the selected reference scan line are fed to the two-dimensional data compression circuit 50, as indicated by the numeral 100. The two-dimensional data compression circuit 50 then codes the current scan line based on the selected reference scan line, as indicated by the numeral 102.

If on the other hand the current scan line to be coded corresponds to the final scan line of the image, as indicated by the numeral 96, the flag is set, as indicated by the numeral 104. If the flag is set, the current scan line to be coded and the selected reference scan line are fed to the two-dimensional data compression circuit 50, and the two-dimensional data compression circuit codes the current scan line based on the selected reference scan line, as indicated by the numerals 100 and 102, respectively. Thereafter, a determination is made that the flag is set, as indicated by the numeral 106, which completes the process.

FIG. 5 is a block diagram of one embodiment of apparatus for adaptively selecting a reference scan line in accordance with the invention, the apparatus being generally indicated by the numeral 29. In the embodiment of the adaptive reference scan line selection apparatus 29 shown in FIG. 5, the scanner 30 is utilized for scanning the image to be coded.

The image data scanned by the scanner 30 appears on the bus 32. The bus 32 connects the scanner 30 to quality estimator circuitry 34 and to the memory 35.

In accordance with the adaptive reference selection apparatus 29 of the invention, the quality estimator circuitry 34 preferably includes a plurality of quality estimator circuits $34_1, 34_2, \ldots 34_K$. There are preferably at least two quality estimator circuits $34_1, 34_2, \ldots 34_K$, and, preferably, there are ten quality estimator circuits. The quality estimator circuits $34_1, 34_2, \ldots 34_K$ are preferably identically structured and also operate identically.

The image data for a plurality of candidate reference scan lines is stored in the memory 35. The memory 35 is connected to the quality estimator circuitry 34 and the multiplexer circuit 36 via the bus 38. In the case where there is a plurality of quality estimator circuits $34_1, 34_2, \ldots 34_K$, the image data for the scan line immediately preceding the current scan line to be coded appears on a bus $38_1$ at the input to the quality estimator circuit $34_1$, the image data for the scan line corresponding to the scan line two scan lines back (i.e., one scan line earlier to the scan line immediately preceding the current scan line to be coded) is connected from the memory 35 to the quality estimator circuit $34_2$ via a bus $38_2$, and the quality estimator circuits $34_3, 34_4, \ldots 34_K$ similarly receive the image data for the remainder of the previous scan lines $l_3, l_4, \ldots l_K$, respectively, via the respective buses $38_3, 38_4, \ldots 38_K$.

The quality estimator circuitry 34 estimates or determines the quality of the candidate reference scan lines vis-a-vis the current scan line to be coded. This determination can be generally described as ascertaining the similarity between the candidate reference scan line and the current scan line to be coded. In one embodiment of the adaptive reference selection apparatus 29 in accordance with the invention, the similarity between the candidate reference scan line and the current scan line to be coded can be based on performing a two-dimensional coding technique, such as the vertical mode coding technique described in "*STANDARDIZATION OF GROUP 3 FACSIMILE APPARATUS FOR DOCU-*

MENT TRANSMISSION," CCITT Recommendation T.4 (Geneva, 1980), which is hereby incorporated by reference in its entirety. Generally, the vertical mode coding technique determines the differences between the scanned image data for the current scan line to be coded with respect to the image data for a reference scan line and, more particularly, each candidate reference scan line in accordance with the adaptive reference selection method and apparatus of the invention, and produces a similarity code or signal having one or more bits.

Alternatively, in another embodiment of the adaptive reference selection apparatus 29 in accordance with the invention, the quality estimator circuitry 34 can comprise gate array circuitry for performing an exclusive-OR combination of the image data for the current scan line to be coded with the image data for each candidate reference scan line in order to ascertain the similarity between the current scan line and the candidate reference scan line. The number of differences is indicated by the number of second logic state signals which appear as a result of the exclusive-OR combination of the image data for the current scan line to be coded with the image data for the candidate reference scan line, which forms a similarity code or signal having one or more bits.

As shown in FIG. 5, the output of the quality estimator circuitry 34 is connected to a quality estimate comparator circuit 42 via a bus 40. The outputs of the respective quality estimator circuits $34_1$, $34_2$, ... $34_K$ are connected via buses $40_1$, $40_2$, ... $40_K$, respectively, to the quality estimate comparator circuit 42 in the case where there is a plurality of quality estimator circuits. The quality estimate comparator circuit 42 determines from the similarity signals produced by the quality estimator circuitry 34 the candidate reference scan line $l_1$, $l_2$, ... $l_K$ which is most similar to the current scan line to be coded and selects the most similar candidate reference scan line as the reference scan line to be used in connection with two-dimensional coding, such as vertical mode coding, of the current scan line.

The quality estimate comparator circuit 42 is connected to the latch circuit 44 via the bus 46. The latch circuit 44 is connected to the multiplexer circuit 36 via the bus 48. The quality estimate comparator circuit 42 enables a given latch included in the latch circuit 44, which corresponds to the latch that controls gating of the image data for the most similar candidate reference scan line from the multiplexer circuit 36 to the two-dimensional data compression circuit 50 via the bus 52.

The image data for the current scan line to be coded is preferably fed to the two-dimensional data compression circuit 50 via the bus $38_1$ for coding while the reference scan line for the next scan line to be coded is being ascertained. The coded current scan line, based on the two-dimensional coding technique, such as the vertical mode coding technique, with the most similar candidate reference scan line, appears on the bus 54.

In one embodiment, a general purpose programmable digital computer can be employed for coding the image data produced by the scanner 30. The computer provides a UNIX-based emulation. The reference selection apparatus 29, for example, can be implemented by means of a UNIX-based microcomputer system, such as a DHL 2000 computer.

Adaptive reference scan line selection for K sets of candidate reference scan line image data can be divided into (K+1) steps. These comprise K steps that produce an estimate of the data compression which results from the use of each candidate reference scan line or, alternatively, of the quality of each candidate reference scan line.

One embodiment of the estimation process can be the two-dimensional data compression coding process, such as the CCITT facsimile data compression coding process (the estimate is the number of bits produced by the data compression process). A quality comparison process compares the estimates and passes the image data for the best reference scan line and the image data for the current scan line to be coded to the two-dimensional data compression process.

Another embodiment of the estimation process is to count the number of bits in the image data for each candidate reference scan line that do not match the image data for the current scan line to be coded. This is preferably performed by an exclusive-OR combination of the image data for each candidate reference scan line with the image data for the current scan line to be coded followed by a count of the number of bits having a predetermined logic state. The candidate reference scan line that produces the lowest number of bits which do not match is selected as the reference scan line.

In accordance with the one embodiment of the adaptive reference selection method of the invention, each candidate reference scan line and the current scan line to be coded are processed by the same two-dimensional coding technique, such as the vertical mode coding technique, that is utilized for data compression in accordance with the two-dimensional data compression coding algorithms, such as the CCITT facsimile data compression coding algorithms, and the number of bits that is produced is counted. The candidate reference scan line that produces the lowest count of bits is selected as the reference scan line. This produces the minimum number of output bits for storage or transmission.

Stated differently, the result of the reference scan line selection process is to be fed together with the current scan line to be coded to the two-dimensional data compression coding process, such as the known CCITT facsimile data compression coding process, which utilizes the two-dimensional coding technique, such as the vertical mode coding technique. If the number of bits which the two-dimensional data compression coding process actually produces is previously determined (i.e., the coding process is performed for each candidate reference scan line and the current scan line to be coded and the number of output bits is counted), then the candidate reference scan line that produces the lowest number of bits when used as the reference scan line subsequently produces the minimum number of output bits when fed with the current scan line to be coded to the given data compression process. This minimizes the amount of image data stored or transmitted.

During the calculation of the number of output bits produced by the two-dimensional data compression coding algorithms, such as the CCITT facsimile data compression coding algorithms with vertical mode coding, for each candidate reference scan line with the next scan line to be coded, the image data for the current scan line to be coded is routed together with the image data for its selected reference scan line to and processed by the two-dimensional data compression coding algorithms with two-dimensional coding. The reference scan line for the next scan line to be coded is the candidate reference scan line with respect to which the number of bits produced by the two-dimensional data compression coding algorithms with two-dimensional coding of the image data for that scan line with the image data for the next scan line to be coded is the least. The calculation is performed for all ten immediately preceding scan lines and selects as the reference scan line the scan line that produces the minimum number of bits. When more than one of the candidate reference scan lines is the same, the most recent of the previous scan lines, more particularly, the closest physically (spatially), is preferably selected as the reference scan line. However, an extensive amount of circuitry is needed for implementation of the one embodiment of the adaptive reference scan line selection method in accordance with the invention.

Considered in more detail, the one embodiment of the adaptive reference scan line selection method in accordance with the invention is shown in FIG. 6. As shown in FIG. 6, a flag is initially cleared, as indicated by the numeral 58. Also, the memory 35 is cleared so that the storage locations included in the memory for the candidate reference scan lines contain the logic zero state (i.e., the scan lines are preferably set as white scan lines), as indicated by the numeral 60.

Next, an iterative procedure for the determination of the reference scan line for each of the scan lines of the image, such as the scan lines $l_1, l_2, \ldots l_M$ shown in FIGS. 1 and 2, is undertaken. Initially, an index, denoted M to correspond to the scan lines of the image to be coded, is set equal to one, as indicated by the numeral 62. Thereafter, the image data for the next scan line to be coded, which is initially the line $l_1$, is output from the scanner 30, as indicated by the numeral 64.

Then, the most similar candidate reference scan line is selected as a reference scan line for the next scan line to be coded. As shown in FIG. 6, the determination of the most similar reference scan line for the next scan line to be coded is illustrated as an iterative procedure, although the sequential iterative procedure can be replaced by a parallel procedure whereby the most similar candidate reference scan line for the next scan line to be coded is determined simultaneously, as will be clear from the description which follows in view of FIG. 5.

Initially, a variable, denoted SUM, is set equal to zero, as indicated by the numeral 66. Next, another index, denoted K to correspond to the number of preceding scan lines which can be used as candidate reference scan lines, is set equal to zero, as indicated by the numeral 68. Thereafter, the index K is set equal to (K−1) to indicate that the immediately preceding scan line to the next scan line to be coded is to be tested as the most similar candidate reference scan line, as indicated by the numeral 70. Consequently, the reference scan line for the next scan line to be coded is set equal to the immediately preceding scan line, as indicated by the numeral 72.

The quality estimator circuitry 34 is responsive to the image data for the immediately preceding scan line and the image data for the next scan line to be coded, which are processed by the two-dimensional data compression coding algorithms, such as the known CCITT facsimile data compression coding algorithms, as indicated by the numeral 74. The result is tested by counting the number of bits produced, as indicated by the numeral 76. Next, a variable, denoted SUMX, is set equal to the number of bits produced by the two-dimensional data compression coding algorithms, as indicated by the numeral 78.

Thereafter, as indicated by the numeral 80, the index K is checked for equality to −1. If the index K equals −1, SUM is set equal to SUMX, and the reference scan line is set to the immediately preceding scan line, as indicated by the numerals 82 and 84, respectively.

Then, as indicated by the numeral 86, the index K is checked for equality to −10 based on the fact that preferably the ten immediately preceding scan lines are used as the candidate reference scan lines in accordance with the adaptive reference scan line selection method of the invention. If the index K does not equal −10, the index K is set equal to (K−1), which in the case of the next iteration through the process means that the candidate reference scan line two scan lines back is tested for being the most similar candidate reference scan line.

Since the memory 35 is initially cleared, as indicated by the numeral 60, there are not ten actual candidate reference scan lines until the eleventh line of the image is scanned. Nevertheless, the adaptive reference scan line selection method in accordance with the invention utilizes the information in the memory 35 as though actual candidate reference scan lines were currently stored in the memory.

If the index K does not equal −1, which indicates that the candidate reference scan line being scrutinized is not the immediately preceding scan line to the next scan line to be coded, SUM is checked to determine if SUMX is smaller than SUM, as indicated by the numeral 88. If on the one hand SUMX is smaller than SUM, SUM is set equal to SUMX, and the reference scan line is set equal to the candidate reference scan line which when processed with the next scan line to be coded resulted in SUMX being smaller than SUM. If on the other hand SUM is smaller than SUMX, SUM is not set equal to SUMX (i.e., SUM is not changed), and the index K is checked to determine whether or not all desired candidate reference scan lines have been tested for which is most similar to the next scan line to be coded, as indicated by the numeral 86. If the last desired candidate reference scan line has been tested, the image data for the tenth scan line back stored in the memory 35 is deleted, as indicated by the numeral 90, and the image data for the next scan line to be coded is stored in the memory, as indicated by the numeral 92.

Next, the next scan line to be coded, for which the most similar candidate reference scan line has just been determined, becomes the current scan line to be coded, as indicated by the numeral 94. The current scan line is then checked to determine whether or not the current scan line is the final scan line of the image to be coded, as indicated by the numeral 96.

If on the one hand the current scan line to be coded is not the final scan line of the image to be coded, the index M is set equal to (M+1), as indicated by the numeral 98, and the reference scan line for the next scan line to be coded is determined analogously to the determination as described above, while the image data for the current scan line to be coded and the image data for the selected reference scan line are fed to the two-dimensional data compression circuit 50, as indicated by the numeral 100. The two-dimensional data compression circuit 50 then codes the current scan line based on the selected reference scan line, as indicated by the numeral 102.

If on the other hand the current scan line to be coded corresponds to the final line of the image, as indicated by the numeral 96, the flag is set, as indicated by the numeral 104. If the flag is set, the image data for the current scan line to be coded and the image data for the selected reference scan line are fed to the two-dimensional data compression circuit 50, and the two-dimensional data compression circuit codes the current scan line based on the selected reference scan line, as indicated by the numerals 100 and 102, respectively. Thereafter, a determination is made that the flag is set, as indicated by the numeral 106, which completes the process.

In accordance with the other embodiment of the adaptive reference scan line selection method of the invention, the immediately preceding ten scan lines are checked for the one that most closely matches the next scan line to be coded as the current scan line to be coded is being coded. The process performs the exclusive-OR of each of the bits of the image data for the next scan line to be coded with each of the bits of the respective image data for each of the ten immediately preceding scan lines and determines the sum of the bits having a predetermined logic state, for example, a logic one state, for each exclusive-OR combination of the next scan line to be coded with each of the immediately preceding ten scan lines. The result of the exclusive-OR combination is either a logic zero state or a logic one state. The result of the exclusive-OR combination is a logic zero state if the bits match (i.e., the bits are both logic zero state or both logic one state). The result of the exclusive-OR combination is a logic one state if the bits do not match (i.e., one bit is a logic zero state and the other bit is a logic one state). The sum of the exclusive-OR combination therefore represents the number of bits that do not match.

During the determination of the sum of the exclusive-OR combination of the image data for each candidate reference scan line with the image data for the next scan line to be coded, the image data for the current scan line to be coded is routed together with the image data for its selected reference scan line to and processed by the two-dimensional data compression coding algorithms, such as the known CCITT facsimile data compression coding algorithms, with two-dimensional coding, such as vertical mode coding. The reference scan line for the next scan line to be coded is the candidate reference scan line with respect to which the sum of the exclusive-OR combination of all the bits in the image data for that scan line with the image data for the next scan line to be coded is the least. The process is conducted for all ten immediately preceding scan lines and selects as the reference scan line the scan line which produces the minimum sum. Bits might not match in different locations with different candidate reference scan lines. However, if the same result (i.e., quality estimate) is obtained in accordance with more than one of the candidate reference scan lines, the most recent of the previous scan lines, more particularly, the closest physically (spatially), is preferably selected as the reference scan line. Typically, the same reference scan line is selected as in the case of the earlier described embodiment. However, the implementation in circuitry is less complex.

Considered in more detail, the other embodiment of the adaptive reference scan line selection method in accordance with the invention is shown in FIG. 7. As shown in FIG. 7, a flag is initially cleared, as indicated by the numeral 58. Also, the memory 35 is cleared so that the storage locations included in the memory for the candidate reference scan lines contain the logic zero state (i.e., the scan lines are preferably set as white scan lines), as indicated by the numeral 60.

Next, an iterative procedure for the determination of the reference scan line for each of the scan lines of the image, such as the scan lines $l_1, l_2, \ldots l_M$ shown in FIGS. 1 and 2, is undertaken. Initially, an index, denoted M to correspond to the lines of the image to be coded, is set equal to one, as indicated by the numeral 62. Thereafter, the image data for the next scan line to be coded, which is initially the scan line $l_1$, is output from the scanner 30, as indicated by the numeral 64.

Then, the most similar candidate reference scan line is selected as a reference scan line for the next scan line to be coded. As shown in FIG. 7, the determination of the most similar reference scan line for the next scan line to be coded is illustrated as an iterative procedure, although the sequential iterative procedure can be replaced by a parallel procedure whereby the most similar candidate reference scan line for the next scan line to be coded is determined simultaneously, as will be clear from the description which follows in view of FIG. 5.

Initially, a variable, denoted SUM, is set equal to zero, as indicated by the numeral 66. Next, another index, denoted K to correspond to the number of preceding scan lines which can be used as candidate reference scan lines, is set equal to zero, as indicated by the numeral 68. Thereafter, the index K is set equal to (K−1) to indicate that the immediately preceding scan line to the next scan line to be coded is to be tested as the most similar candidate reference scan line, as indicated by the numeral 70. Consequently, the reference scan line for the next scan line to be coded is set equal to the immediately preceding scan line, as indicated by the numeral 72.

The quality estimator circuitry 34 is responsive to the image data for the immediately preceding scan line and the image data for the next scan line to be coded such that an exclusive-OR combination of the image data for the candidate reference scan line and the image data for the next scan line to be coded is performed, as indicated by the numeral 108. Each non-match of a bit in the image data for the candidate reference scan line as compared to the bit in the corresponding location in the image data for the next scan line to be coded produces a bit having a logic one state. The total of the logic one state bits, more particularly, the non-matching bits, produced by the exclusive-OR combination of the image data for the candidate reference scan line and the image data for the next scan line to be coded is determined, as indicated by the numeral 110, and a variable, denoted SUMX, is set equal to the sum of the logic one state bits, as indicated by the numeral 112.

Thereafter, as indicated by the numeral 80, the index K is checked for equality to −1. If the index K equals −1, SUM is set equal to SUMX, and the reference scan line is set to the immediately preceding scan line, as indicated by the numerals 82 and 84, respectively.

Then, as indicated by the numeral 86, the index K is checked for equality to −10 based on the fact that preferably the ten immediately preceding scan lines are used as the candidate reference scan lines in accordance with the adaptive reference selection method of the invention. If the index K does not equal −10, the index K is set equal to (K−1), which in the case of the next iteration through the process means that the candidate reference scan line two lines back is tested for being the most similar candidate reference scan line.

Since the memory 35 is initially cleared, as indicated by the numeral 60, there are not ten actual candidate reference scan lines until the eleventh line of the image is scanned. Nevertheless, the adaptive reference scan line selection method in accordance with the invention utilizes the information in the memory 35 as though actual candidate reference scan lines were currently stored in the memory.

If the index K does not equal −1, which indicates that the candidate reference scan line being scrutinized is not the immediately preceding scan line to the next scan line to be coded, SUM is checked to determine if SUMX is smaller than SUM, as indicated by the numeral 88. If on the one hand SUMX is smaller than SUM, SUM is set equal to SUMX, and the reference scan line is set equal to the candidate reference scan line which when combined with the next scan line to be coded resulted in SUMX being smaller than SUM. If on the other hand SUM is smaller than SUMX, SUM is not set equal to SUMX (i.e., SUM is not changed), and the index K is checked to determine whether or not all desired candidate reference scan lines have been tested for which is most similar to the next scan line to be coded, as indicated by the numeral 86. If the last desired candidate reference scan line has been tested, the image data for the tenth scan line back stored in the memory 35 is deleted, as indicated by the numeral 90, and the image data for the next scan line to be coded is stored in the memory, as indicated by the numeral 92.

Next, the next scan line to be coded, for which the most similar candidate reference scan line has just been determined, becomes the current scan line to be coded, as indicated by the numeral 94. The current scan line to be coded is then checked to determine whether or not the current scan line is the final scan line of the image to be coded, as indicated by the numeral 96.

If on the one hand the current scan line to be coded is not the final scan line of the image to be coded, the index M is set equal to (M+1), as indicated by the numeral 98, and the reference scan line for the next scan line to be coded is determined analogously to the determination as described above, while the image data for the current scan line to be coded and the image data for the selected reference scan line are fed to the two-dimensional data compression circuit 50, as indicated by the numeral 100. The two-dimensional data compression circuit 50 then codes the current scan line based on the selected reference scan line, as indicated by the numeral 102.

If on the other hand the current scan line to be coded corresponds to the final line of the image, as indicated by the numeral 96, the flag is set, as indicated by the numeral 104. If the flag is set, the image data for the current scan line to be coded and the image data for the selected reference scan line are fed to the two-dimensional data compression circuit 50, and the two-dimensional data compression circuit codes the current scan line based on the selected reference scan line, as indicated by the numerals 100 and 102, respectively. Thereafter, a determination is made that the flag is set, as indicated by the numeral 106, which completes the process.

Preferably, the most recent sixteen lines scanned are stored in the reference file in the memory 35 so that the same circuit implementation can be employed at the transmitter and the receiver of the facsimile transmission apparatus. At the transmitter, where image data is compressed, the next scan line to be encoded, the current scan line to be encoded, and the ten immediately preceding scan lines are stored, which totals twelve lines. At the receiver, where the transmitted image data is decompressed, the next scan line to be decoded, the current scan line to be decoded, and the ten immediately preceding decompressed scan lines, as well as four additional lines for the enlargement and reduction processes, are stored.

The choice of ten for the number of immediately preceding scan lines to be checked as candidate reference scan lines is empirical and is based on analysis of the screening size of pre-screened pictorial information which appears in commercially available publications, such as magazines and newspapers. The size ranges from two and one-half scan points 22 per pixel 14 to ten scan points per pixel. The number of immediately preceding scan lines to be checked as candidate reference scan lines can be more than ten, however, although the circuit cost increases as more scan lines must be stored and processed.

The method and apparatus in accordance with the invention provide for selecting a reference scan line for two-dimensional coding, such as vertical mode coding, compatible with two-dimensional data compression coding algorithms, such as the CCITT facsimile data compression coding algorithms in accordance with the specifications described in "*STANDARDIZATION OF GROUP 3 FACSIMILE APPARATUS FOR DOCUMENT TRANSMISSION*," CCITT Recommendation T.4 (Geneva, 1980). The reference scan line selection method and apparatus in accordance with the invention are particularly useful for coding an image to allow data compression in connection with facsimile transmission, thereby reducing the cost of operation of the facsimile transmission apparatus through a reduction in the cost of use of the communication link. This provides an improvement over known image coding techniques in connection with data compression, including the known vertical mode coding technique, and can be applied to any coding technique that uses either previously stored image data or a collection of predetermined image data patterns as a reference for compressing image data to be stored or transmitted. This reduces the amount of storage required or the amount of image data transmitted over a communication link and thus reduces cost.

Although the invention has been described and illustrated in detail, it is to be clearly understood that the same is by way of illustration and example only and is not to be taken by way of limitation. Various modifications not described may occur to those skilled in the art which fall within the spirit of this invention. Consequently, the scope of this invention is better ascertained by reference to the appended claims.

What is claimed is:

1. A method for processing image data for data compression, said image data comprising pixels and representing a two-dimensional screened image, said image data defining successive input scan lines, including a first scan line, a second scan line immediately preceding said first scan line, and a third scan line preceding said first scan line, said method comprising the steps of:

establishing said first scan line as a current scan line; and selecting a reference scan line while examining said image data on the bases of the size or frequency of occurrence of said pixels of said image data, said reference scan line being selected from among said preceding second scan line and said preceding third scan line, and said current scan line and said reference scan line being for use in connection with a two-dimensional image coding process wherein data compression is directly related to a pattern relationship between said current scan line and said reference scan line.

2. The method of claim 1 wherein said selecting step comprises:
  comparing said current scan line with each one of at least two candidate scan lines selected from ones of said input scan lines preceding said current scan line to obtain pattern relationship criteria, said candidate scan lines including said preceding second scan line and said preceding third scan line; and
  choosing as said reference scan line the one of said candidate scan lines which yields a most desired one of said pattern relationship criteria relative to said current scan line.

3. The method of claim 2 wherein said pattern relationship criteria are correlations between recurring image patterns in said candidate scan lines and said current scan line.

4. The method of claim 2 wherein said pattern relationship criteria are metrics indicative of code representations of said image data.

5. The method of claim 4 wherein said comparing step comprises:
  applying a vertical mode coding technique to said current scan line using each of said candidate scan lines as a coding reference for said current scan line to obtain compressed image data comprising output bits; and
  determining the number of output bits obtained in said applying step by using each of said candidate scan lines as a coding reference for said current scan line; and wherein said choosing step comprises:
  selecting as said reference scan lines the candidate scan line for which the least number of outputs bits was obtained.

6. The method of claim 2 wherein said comparing step comprises:
  summing differences between image data of said current scan line and corresponding image data for each said candidate scan line; and wherein said choosing step comprises:
  selecting as said reference scan line the candidate scan line yielding the least number of said differences.

7. The method of claim 6 wherein said comparing step further comprises:
  exclusive-OR combining image data of each said candidate scan line with corresponding image data of said current scan line.

8. The method of claim 7 wherein said selecting step includes selecting as said reference scan line the candidate scan line producing said least number of said differences and which more closely precedes said current scan line than any other candidate scan line producing said least number of said differences.

9. An apparatus for processing image data for data compression, said image data comprising pixels and representing a two-dimensional screened image, said image data defining successive input scan lines, including a first scan line, a second scan line immediately preceding said first scan line, and a third scan line preceding said first scan line, said apparatus comprising:
  means for establishing said first scan line as a current scan line; and
  means for selecting a referene scan line while examining said image data on the basis of the size or frequency of occurrence of said pixels of said image data, said reference scan line being selected from among said proceeding second scan line and said preceding third scan line, and said current scan line and said reference scan line being for use in connection with a two-dimensional image coding process wherein data compression is directly related to a pattern relationship between said current scan line and said reference scan line.

10. The apparatus of claim 9 wherein said selecting means comprises:
  means for comparing said current scan line with each one of at least two candidate scan lines selected from ones of said input scan lines preceding said current scan line to obtain pattern relationship criteria, said candidate scan lines including said preceding second scan line and said preceding third scan line; and
  means for choosing as said reference scan line the one of said candidate scan lines which yields a most desired one of said pattern relationship criteria relative to said current scan line.

11. The apparatus of claim 10 wherein said pattern relationship criteria are correlations between recurring image patterns in said candidate scan lines and said current scan line.

12. The apparatus of claim 10 wherein said pattern relationship criteria are metrics indicative of code representations of said image data.

13. The apparatus of claim 10 wherein said comparing means comprises:
  means for applying a vertical mode coding technique to said current scan line using each of said candidate scan lines as a coding reference for said current scan line to obtain compressed image data comprising output bits; and
  means for determining the number output bits obtained by said applying means by using each of said candidate scan lines as a coding reference for said current scan line; an wherein said choosing means comprises
  means for selecting as said reference scan line the candidate scan line for which the least number of output bits was obtained.

14. The apparatus of claim 10 wherein said comparing means comprises:
  means for summing differences between image data of said current scan line and corresponding image data for each said candidate scan line; and wherein said choosing means comprises:
  means for selecting as said reference scan line the candidate scan line yielding the least number of said differences.

15. The apparatus of claim 18 wherein said comparing means further comprises:
  exclusive-OR means operative to combine image data of each said candidate scan line with corresponding image data of each said current scan line.

16. The method of claim 15 wherein said selecting means includes means for selecting as said reference scan line the candidate scan line producing said least number of said difference and which more closely precedes said current scan line than any other candidate scan line producing said least number of said differences.

* * * * *

UNITED STATES PATENT AND TRADEMARK OFFICE
CERTIFICATE OF CORRECTION

PATENT NO. : 4,729,034
DATED : March 1, 1988
INVENTOR(S) : Lawrence G. Roberts et al.

It is certified that error appears in the above—identified patent and that said Letters Patent is hereby corrected as shown below:

In col. 20, line 5, delete "proceeding" and insert --preceding--.

In col. 20, line 56, delete "18" and insert --14--.

In col. 20, line 61, delete "method" and insert --apparatus--.

In col. 20, line 64, delete "difference" and insert --differences--.

Signed and Sealed this

Seventeenth Day of November, 1992

Attest:

DOUGLAS B. COMER

Attesting Officer     Acting Commissioner of Patents and Trademarks